United States Patent [19]
Willey et al.

[11] Patent Number: 5,167,868
[45] Date of Patent: Dec. 1, 1992

[54] CONDUCTIVE EXPANDABLE CARBONACEOUS PASTE MATERIAL

[75] Inventors: Harvey E. Willey; William R. Clark, both of Lawrenceburg; Harold L. King, St. Joseph, all of Tenn.

[73] Assignee: UCAR Carbon Technology Corporation, Danbury, Conn.

[21] Appl. No.: 658,700

[22] Filed: Feb. 21, 1991

[51] Int. Cl.$^5$ .............. H01B 1/04; H01B 1/06; H01B 1/02; D03D 3/00

[52] U.S. Cl. .................... 252/502; 252/500; 252/510; 252/511; 252/512; 252/508; 428/106; 428/244; 428/273; 428/278

[58] Field of Search ............... 252/502, 511, 500, 510, 252/512, 508; 428/106, 244, 273, 278

[56] References Cited

U.S. PATENT DOCUMENTS

| | | | |
|---|---|---|---|
| 3,404,061 | 10/1968 | Shane et al. | 161/125 |
| 3,719,608 | 3/1973 | Olstowski | 252/508 |
| 3,871,986 | 3/1975 | Reamey et al. | 252/510 |
| 4,277,532 | 7/1981 | Czepel et al. | 428/244 |
| 4,717,595 | 1/1988 | Watanabe et al. | 252/511 |
| 4,775,455 | 10/1988 | Chandramouli et al. | 252/511 |
| 4,897,170 | 1/1990 | Chandramouli et al. | 252/511 |

OTHER PUBLICATIONS

2 Page price list for UCAR dated Jan. 30, 1989 for Carbonaceous Cements and Carbon Pastes for Refractory Applications Grade C-37.

Primary Examiner—Paul Lieberman
Assistant Examiner—William S. Parks
Attorney, Agent, or Firm—F. J. McCarthy

[57] ABSTRACT

An expandable carbonaceous paste comprising natural graphite flakes and expandable graphite flakes such as acid treated graphite flakes, mixed with a hydrocarbon viscous liquid such as tar so that when the paste is exposed to heat, the paste will expand and have good thermal conductivity characteristics and then upon further heating the paste will convert to a rigid carbon structure.

14 Claims, No Drawings

CONDUCTIVE EXPANDABLE CARBONACEOUS PASTE MATERIAL

FIELD OF THE INVENTION

The invention relates to an expandable carbonaceous paste comprising expandable graphite flakes and a hydrocarbon viscous liquid such as tar and when the paste is inserted between articles and subjected to heat, the paste will expand to provide a good thermal conductivity between the articles.

BACKGROUND OF THE INVENTION

There are many types of paste materials used to repair articles or bodies together. Most of the paste materials form a hard structure and/or shrink upon heating. In applications requiring good thermal conductivity in order to effectively enhance cooling, carbon base materials have been employed. Ramable, plastic carbonaceous grout has been packed around cooling plates in carbon block furnace linings, such as blast furnaces. Carbon base ramming pastes or grouts have been used in furnace applications but, however, such pastes or grouts generally shrink on curing or baking producing voids and related poor thermal conductivity. In addition, conventional cement type paste generally set-up to form very hard structures that are difficult to remove. In one type of cement, expandable graphite is employed along with a phenolic resin to produce a rigid cement composite.

It is an object of the present invention to provide an expandable, moldable, carbonaceous paste that contains expandable graphite flakes.

It is another object of the present invention to provide an expandable, non-shrinking carbonaceous paste that will expand when exposed to heat.

It is another object of the present invention to provide an expandable carbonaceous paste that has good thermal conductivity characteristics.

It is another object of the present invention to provide an expandable carbonaceous paste that will expand when exposed to heat and then solidfy to a rigid carbon structure when subjected to further heating at a higher temperature.

SUMMARY OF THE INVENTION

The invention relates to an expandable carbonaceous paste comprising particulate carbonaceous material and particulate expandable graphite flakes, mixed in a hydrocarbon viscous liquid. The hydrocarbon viscous liquid functions as a carbon producing binder that remains moldable at 20° C. and does not become completely rigid until heated to about its coking temperature.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size; the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties which are highly directional. Briefly, flake graphites may be characterized as laminated structures of carbon, that is, structures consisting of superposed layers or laminae of carbon atoms joined together by weak van der Waals forces. In considering the graphite structure, two axes or directions are usually noted, to wit, the C axis or direction (perpendicular to the surface of the flake) and the A axis or direction in the plane of the flake. For simplicity, the C axis or direction may be considered as the direction perpendicular to the carbon layers. The A axes or directions may be considered as the directions parallel to the carbon layers or the directions perpendicular to the C direction.

Among the graphites which may exhibit or possess a high degree of orientation, mention may be made of natural graphites, Kish graphite and synthetic graphites such as for example, pyrolytic graphites. Natural graphites are generally found or obtained in the form of small, soft flakes or powder. Kish graphite is the excess carbon which crystallizes out in the course of smelting iron. The graphite separates as fine flakes and is very similar to flake natural graphite. Synthetic or pyrolytic graphites are produced by the pyrolysis or thermal decomposition of a carbonaceous gas on a suitable substrate or mandrel heated at an elevated temperature. The graphite deposit can be separated from the substrate in the form of a coherent mass. If desired, the graphite mass can be pulverized, comminuted, shaved or the like to produce synthetic graphite particles, e.g. flake, or the like.

As noted above, the bonding forces holding the parallel layers of carbon atoms together are only weak van der Waals forces. It has been found that graphites having a high degree of orientation such as, for example, natural graphites, Kish graphite and synthetic graphites, can be treated so that the spacing between the superposed carbon layers or laminae can be appreciably opened up so as to provide a marked expansion in the direction perpendicular to the layers, that is, in the c direction and thus form an expanded or intumesced graphite structure in which the laminar character is substantially retained.

In U.S. Pat. Nos. 1,137,373 and 1,191,383, natural graphite in the form of flake of a size too great to pass through a 200 mesh screen is expanded by first subjecting the graphite particles for a suitable period of time to a liquid oxidizing medium maintained at a suitable temperature. Upon completion of the oxidizing treatment, the soggy graphite particles or masses are washed with water and then heated to between about 350° C. and 600° C. to more fully expand the graphite particles in the c direction. The liquid oxidizing mediums disclosed are mixtures of sulfuric and nitric acids and mixtures of nitric acid and potassium chlorate. By the above treatment, expansions of the natural graphite particles of up to about 25 times the original bulk were obtained. It is also disclosed that the expanded natural graphite can be compounded with a binder, e.g. a phenolic resin and the resultant composition compressed or molded into various forms, such as discs, rings, rods, sheets, etc.

Expandable graphite material is preferably produced by subjecting the natural graphite particles to oxidizing conditions. Various oxidizing agents and oxidizing mixtures may be employed to effect controlled interlayer attack. For example, there may be utilized nitric acid, potassium chlorate, chromic acid, potassium permanganate, potassium chromate, potassium dichromate, perchloric acid and the like, or mixtures such as, for instance, concentrated nitric acid and potassium chlorate, chromic acid and phosphoric acid, sulfuric acid and nitric acid, etc., or mixtures of a strong organic acid, e.g. trifluoroacetic acid and a strong oxidizing agent soluble in the organic acid used. A wide range of oxidizing agent concentrations can be utilized. Oxidizing agent solutions having concentrations ranging from 0.1 normal to concentrated strengths may be effectively employed to bring about interlayer attack. The acids utilized to form suitable oxidizing mediums or mixtures can also be employed in concentrations ranging from about 0.1 normal to concentrated strengths.

In one embodiment, the oxidizing medium comprises sulfuric acid and an oxidizing agent such as nitric acid, perchloric acid, chromic acid, potassium permanganate, iodic or periodic acids or the like. One preferred oxidizing medium comprises sulfuric and nitric acids. The ratio of sulfuric acid to oxidizing agent, and more particularly, nitric acid can range from about 9 to 1 or higher to about 1 to 1. Likewise, various sulfuric and nitric acid concentrations can be employed, e.g. 0.1N. 1.0N, 10N and the like.

The treatment of graphite particles with oxidizing agents or oxidizing mixtures such as mentioned above is preferably carried out at a temperature between about room temperature and about 125° C. and for periods of time sufficient to produce a high degree of interlayer attack. The treatment will depend upon such factors as the temperature of the oxidizing medium, grade or type of graphite treated, graphite particle size, amount of expansion desired and strength of the oxidizing medium.

Upon completion of the treatment directed to promoting interlayer attack, the thoroughly wetted or soggy graphite particles can be subjected to conditions for bringing about the expansion thereof. Preferably, however, the treated graphite particles are rinsed with an aqueous solution. The rinsing or washing of the treated graphite particles with aqueous solutions may serve several functions. For instance, the rinsing or leaching removes harmful materials, e.g. acid, from the graphite particles so that it can be safely handled.

In the subject invention the treated graphite prior to being expanded is incorporated into a paste formulation so that when heated the treated graphite could expand up to 100 times or more in the c direction. As used herein expandable graphite is treated graphite that is capable of expansion up to 100 times or more in the c direction. The expandable graphite material for use in this invention is expandable graphite flakes. U.S. Pat. No. 3,404,061 discloses a process for making expandable graphite flakes suitable for use in the paste formulations of this invention. The teachings of this '061 patent is incorporated herein as if it were presented in its entirety. Generally, the size of the expandable graphite flakes suitable for use in this invention can be from a 20 mesh size to a 325 mesh size, preferably from a 20 to 80 mesh size wherein the mesh sizes are Tyler mesh sizes. In most applications, the percent by weight of the expandable graphite in the paste could be from 6 to 25, preferably from 7 to 15 and most preferably from 8 to 12. It is to be understood that where more expansion of the paste is desired, then a larger amount of expandable graphite flakes would be used.

The particulate carbonaceous filler material for use in the expandable paste can be graphite flakes, graphite flour, carbon dust, and the like, preferably, the particulate carbonaceous material would be non-expandable graphite flakes preferably sized from 20 mesh to 325 mesh, more preferably from 20 mesh to 80 mesh and be present in the paste from 40 to 80 weight percent, preferably 50 to 70 weight percent based on the weight of the paste.

The hydrocarbon viscous liquid for use in this invention is preferably tar having a coking value of at least 20%, more preferably at least 30% as determined by ASTM method D-2416. The teaching of this ASTM D-2416 is incorporated herein as if it were presented in its entirety. Preferably, the tar would comprise from 15 to 60 weight percent of the paste, and more preferably from 20 to 50 weight percent of the paste. The tar will function as a moldable binding agent so that the paste will be a moldable paste at 20° C. and remain moldable up to the temperature at which the tar becomes coke and converts the paste to a rigid carbon structure. Thus, when the expandable paste is initially heated it will expand and then upon further heating it will convert to a rigid carbon structure when the tar is coked. Tars derived from coal tar or petroleum can be used in this invention.

A plasticizer could also be used in this invention and would function to reduce the viscosity of the paste, preferably, the plasticizer should have a low melting point of about 70° C. or less.

Examples of plasticizers for use in preparing the paste of this invention would be fatty acids such as stearic acid and oleic acid and liquid soap. Although soap is recited as a plasticizer it would function more as a lubricant and preferably would be used along with another plasticizer such as stearic acid. The fluidity or plasticity of the paste may be varied depending on its ultimate application. For most applications, the plasticizer comprises from 1.5 to 10 percent by weight of the paste composition, preferably from 2.5 to 8 weight percent of the paste. The soap could comprise the same amount as the preferred plasticizer, stearic acid.

The expandable paste is ideally suited for installation of coolers in existing blast furnace linings where good thermal contact is essential. It is also ideally suited for laying up refractory blocks or pointing and repairing existing carbon refractories. After installation, normal process heat will cause the treated expandable graphite flakes to expand thereby providing good thermal contact with adjacent blocks and upon further heating, the tar becomes coke and converts the expanded paste to a rigid carbon structure.

Another embodiment of the invention would entail the use of a large amount of tar in the expandable graphite composition so as to produce a more cohesive body or structure. This formulation can be preformed into relatively cohesive blocks or other shapes for a particular application and such cohesive shapes will retain a stiff, plastic-like consistency. The cohesive shapes, when formed into rectangular blocks, could then be used to repair or replace a variety of carbon refractory linings in furnaces and crucibles. An improvement in these types of blocks is that the use of expandable graphite material will cause the block to expand on heating, thus providing good contact and excellent thermal conductivity for adjacent blocks. Further heating cokes the tar producing a rigid carbon structure. Contrary to this, conventional types of carbonaceous grout and paste characteristically shrink on heating thereby creating undesirable cracks and voids.

EXAMPLE

| Components | Example Wt. % | Description |
| --- | --- | --- |
| Graphite Flake = | 60.0 | Material is pre-pressed into briquettes or blocks for convenient use. Paste expands during curing and sets to a hard, dense consistency. |
| Expandable Graphite Flake = | 10.0 | |
| Tar = | 25.0 | |
| Stearic Acid (plastizer) = | 2.5 | |
| Paste Soap = | 2.5 | |

The graphite flakes were sized 80% −30+100 Tyler mesh, the expandable graphite flakes were acid treated flakes sized −20+80 Tyler mesh and the tar was a coal tar product with a coking value of 30% minimum. The soap was Intex Soap obtained from the Intex product Co. (Intex is a trademark of Intex product Co.). The soap functioned as a lubricating vehicle for the components of the paste. The plasticizer, stearic acid, was added to make the composition less viscous or more fluid. As recited under the description column, the paste was pre-pressed into briquettes or blocks and when heated, the blocks expanded to provide a structure having excellent thermal conducting characteristics and upon further heating the expanded blocks were converted to a rigid, dense carbon structure.

Although the present invention has been described with reference to particular details, it is not intended that these details shall be construed as limiting the scope of the invention.

What is claimed is:

1. An expandable carbonaceous composition comprising particulate expandable graphite flakes and an effective amount of particulate non-expandable carbonaceous material mixed with from 15 to 60 weight percent of hydrocarbon viscous liquid in which the composition when exposed to heat will expand due to the presence of the particulate expandable graphite flakes.

2. The expandable carbonaceous composition of claim 1 wherein the hydrocarbon viscous liquid is tar.

3. The expandable carbonaceous composition of claim 2 wherein the particulate carbonaceous material is graphite flakes.

4. The expandable carbonaceous composition of claim 3 wherein the hydrocarbon viscous liquid is tar.

5. The expandable carbonaceous composition of claim 4 wherein said particulate carbonaceous graphite flakes comprises from 40 to 80 weight percent, said particulate expandable graphite flakes comprises from 6 to 25 weight percent; and said tar comprises from 15 to 60 weight percent of the composition.

6. The expandable carbonaceous composition of claim 5 wherein said particulate carbonaceous graphite flakes comprises from 50 to 70 weight percent; said expandable graphite flakes comprises from 7 to 15 weight percent; and said tar comprises from 20 to 50 weight percent of the paste.

7. The expandable carbonaceous paste of claim 1 wherein a plasticizer is added to the paste, said plasticizer selected from the group consisting of fatty acids and soap and wherein the plasticizer is from 1.5 to 10 weight percent of the paste.

8. The expandable carbonaceous composition of claim 7 wherein said non-expandable particulate carbonaceous graphite flakes comprises from 40 to 80 weight percent; said particulate expandable graphite flakes comprises from 6 to 25 weight percent; and said tar comprises from 15 to 60 weight percent of the paste.

9. The expandable carbonaceous composition of claim 8 wherein said plasticizer is stearic acid.

10. The expandable carbonaceous composition of claim 9 where the paste further comprises soap and said soap is from 1.5 to 8 weight percent of the paste.

11. The expandable carbonaceous composition of claim 2 wherein said tar has a coking value of at least 20%.

12. The expandable carbonaceous composition of claim 7 wherein said particulate carbonaceous material is graphite flakes; said particulate said hydrocarbon viscous liquid is tar; and said plasticizer is stearic acid.

13. The expandable carbonaceous composition of claim 12 wherein the paste further comprises soap.

14. The expandable carbonaceous composition of claim 13 wherein said graphite flakes comprises 60 weight percent; said expandable graphite flakes comprises 10 weight percent; said tar comprises 25 weight percent; and said soap comprises 2.5 weight percent; and said soap comprises 2.5 weight percent of the paste.

* * * * *